United States Patent [19]
DeBerry

[11] 4,126,529
[45] Nov. 21, 1978

[54] FERROUS ION SCRUBBING OF FLUE GAS

[75] Inventor: David W. DeBerry, Austin, Tex.

[73] Assignee: Southern California Edison Company, Rosemead, Calif.

[21] Appl. No.: 822,212

[22] Filed: Aug. 5, 1977

[51] Int. Cl.² .................. B01D 13/02; C01B 17/00
[52] U.S. Cl. ...................... 204/180 P; 204/151; 423/242; 423/574 L
[58] Field of Search ............ 204/151, 180 P, 301; 423/242, 243, 244, 574 L

[56]  References Cited
U.S. PATENT DOCUMENTS

| | | | |
|---|---|---|---|
| 3,523,880 | 8/1970 | Parsi | 204/180 P |
| 3,554,895 | 1/1971 | McRae et al. | 204/301 |
| 3,761,369 | 9/1973 | Tirrell | 204/151 |
| 3,788,959 | 1/1974 | Smith | 204/180 P |
| 3,969,207 | 7/1976 | Kerti et al. | 204/151 X |
| 3,974,258 | 8/1976 | Poitevin et al. | 423/242 |
| 4,076,793 | 2/1978 | Nikolai | 423/242 |

FOREIGN PATENT DOCUMENTS 131,951  12/1974  Japan.

Primary Examiner—Arthur C. Prescott
Attorney, Agent, or Firm—Lyon & Lyon

[57] ABSTRACT

An apparatus and method for removing oxides of nitrogen and sulfur from flue gases. The apparatus comprises an enclosure wherein the flue gases are washed with a scrubbing solution, preferably containing ferrous chelates and sulfite ions, and an electrochemical cell for regenerating the spent scrubbing solution. The electrochemical cell preferably comprises a plurality of cathode and anode compartments separated by ion transfer membranes. The spent scrubbing solution is regenerated by passing the solution through the cathode compartments of the electrochemical cell. The regeneration process involves the removal of the sulfate ions from the scrubbing solutions through the ion transfer membranes and the reduction of the nonreactive ferric chelate to the reactive ferrous chelate.

13 Claims, 1 Drawing Figure

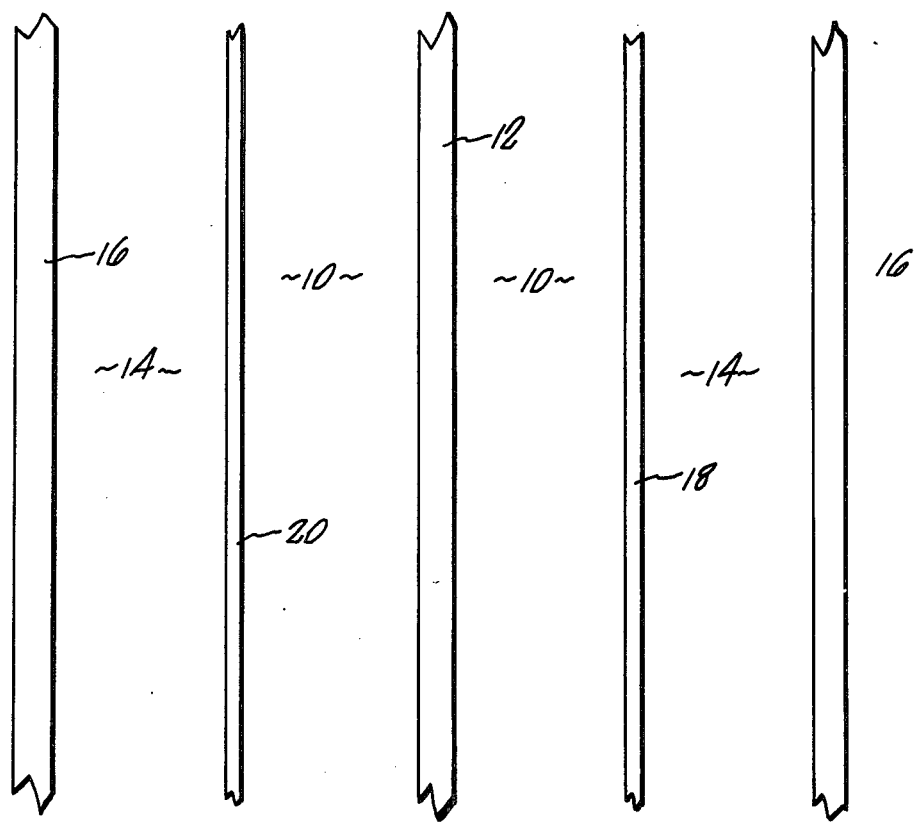

FERROUS ION SCRUBBING OF FLUE GAS

BACKGROUND

The present invention relates to an apparatus and method for scrubbing flue gases to remove oxides of nitrogen and sulfur and, in particular, the present invention relates to an apparatus and method for regenerating the gas scrubbing solution.

In recent years, there has been a growing concern over the problem of air pollution. In some industrialized urban areas, this problem has become acute. There are a variety of sources of air pollution such as the internal combustion engine, fossil fuel power generating plants and metallurgical and chemical plants.

It is well known that the flue gases from the combustion of fossil fuels, such as oil and coal, contain sulfur dioxide and nitrogen oxides. These pollutants occur from the combustion of sulfur and nitrogen compounds in the fuels and, in the case of nitrogen oxides, from the high temperature reaction of nitrogen and oxygen gases at the point of combustion. Nitrogen oxides contribute to air pollution by the formation of chemical smog and sulfur dioxide creates potential health hazards.

One prior solution to this problem is to utilize low sulfur and low nitrogen fuels in fossil fuel burning plants. However, with more stringent regulations regarding flue gas emissions, it has become increasingly important to limit the quantities of these pollutants released into the atmosphere.

Another prior solution to this problem is to wash the flue gas with various scrubbing solution before releasing the gas into the atmosphere. Conventional wet scrubbers typically employ an enclosure wherein the flue gas is washed with the scrubbing solution to remove the pollutants. One prior scrubbing solution comprised an aqueous alkali solution. Although this solution removed sulfur dioxide and nitrogen dioxide from the flue gas, the solution was ineffective in removing nitric oxide from the flue gas. Another prior scrubbing solution comprised an alkaline solution of sulfite or thiosulfite. Although this solution removed oxides of sulfur and nitrogen from the flue gas, removal of the oxides required that the solution be in contact with the flue gas a substantial length of time.

Another prior scrubbing solution comprised an aqueous solution of ferrous chelates. This solution was effective in removing oxides of nitrogen from flue gas. The scrubbing process also resulted in the conversion of sulfur dioxide to sulfate ions and the oxidation of the ferrous chelates to ferric chelates. Since the ferric chelate was ineffective in removing nitrogen oxide from flue gas, it was necessary to regenerate the scrubbing solution by reducing the ferric chelate back to to ferrous chelate by suitable means such as electrolytic reduction before it could be reused in the scrubber. Unfortunately, with continued use, there was an increase in the concentration of sulfate ions in the scrubbing solution. Eventually, the increase in concentration of sulfate ions resulted in the precipitation of a sulfate salt in the scrubber. Prior methods of removing sulfate ions from solution, involving side stream chemical and thermal treatment. However, these methods of treatment are complex and require a large number of process steps. Therefore, an improved process for the removal of oxides of nitrogen and sulfur from flue gases is still desired.

SUMMARY OF THE INVENTION

It is therefore an object of the present invention to provide an improved apparatus and method for removing oxides of nitrogen and sulfur from flue gases.

It is another object of the present invention to provide an improved apparatus and method for regenerating a scrubbing solution for washing flue gases containing oxides of nitrogen and sulfur.

These and other objects and advantages are obtained by providing an apparatus for scrubbing flue gases to remove oxides of nitrogen and sulfur generally comprising an enclosure wherein the flue gases are washed with a scrubbing solution, probably containing ferrous chelates and sulfite ions, and an electrochemical cell for regenerating the spent scrubbing solution. The electrochemical cell preferably comprises a plurality of cathode and anode compartments separated by ion transfer membranes. The cathode compartments are in fluid communication with the enclosure to enable the flow of scrubbing solution therethrough. The anode compartments are preferably connected to a recirculating source of acid to enable the flow of acid therethrough. The ion selective membrane permits the transport of sulfate ions therethrough.

During the scrubbing process the nitrogen oxides are converted to non-polluting nitrogen gas which is released into the atmosphere. The sulfur dioxide in the flue gas is converted into sulfate ions and a portion of the ferrous chelate is oxidized to ferric chelate.

The spent scrubbing solution is then regenerated by passing the solution through the cathode compartments of the electrochemical cell. The regeneration process involves the removal of the sulfate ions from the scrubbing solutions and the reduction of the non-reactive ferric chelate to the reactive ferrous chelate. In the cathode compartment, the ferric chelate is reduced to ferrous chelate at the cathodes by electrons supplied by an external power source. In the anode compartments, the recirculating water is oxidized to form oxygen and hydrogen ions. The current flowing between the anodes and cathodes cause transport of the sulfate ions from the scrubbing solution through the ion transfer membrane into the anode compartment. In the anode compartment, the sulfate ions combine with the hydrogen ions to form sulfuric acid. The resultant excess of sulfuric acid is then removed from the recirculating water solution by the addition of slaked lime to form a gypsum precipitate which is readily removed from the solution. The regenerated scrubbing solution is recycled from the cathode compartments back to the enclosure for further use.

BRIEF DESCRIPTION OF DRAWINGS

A more thorough disclosure of the objects and advantages of the present invention is presented in the detailed description which follows and from the accompanying drawing which is an illustration of a suitable regenerative electrochemical cell for the practice of the present invention.

DETAILED DESCRIPTION OF THE INVENTION

The present invention relates to an apparatus and method for scrubbing flue gases to remove oxides of nitrogen and sulfur. The apparatus comprises generally an enclosure for wet scrubbing of the flue gases and an electrochemical cell for regenerating the spent scrubbing solution. A suitable enclosure for use in the practice of the present invention is enclosed in the Weir U.S. Pat. No. 3,948,608 issued on Apr. 6, 1976, the disclosure of which is incorporated herein by reference. However, it will be obvious to one skilled in the art that other suitable types of enclosures may also be utilized in the practice of the present invention.

The electrochemical cell of the present invention comprises an anode and cathode compartment separated by a suitable ion transfer membrane. The electrochemical cell preferably comprises a plurality of anode and cathode compartments having a plurality of anion and cation transfer membranes alternately disposed therebetween.

The cathodes of the electrochemical cell preferably comprise a material which is chemically resistant to the scrubing solution, has a high hydrogen overvoltage, low electrical resistance and high structural strength. A suitable material for the cathodes is stainless steel. The cathodes are preferably comprised of a combination of a plate and wire mesh to obtain higher current densities. The anodes preferably comprise a material which is stable and non-corroding, e.g., lead or lead alloys. However, it will be obvious to one skilled in the art that other suitable materials may also be utilized to form the cathodes and anodes of the present invention. Further, it will be obvious to one skilled in the art that other suitable electrochemical cells may also be utilized in the practice of the present invention such as those disclosed in Industrial Electrochemical Processes, A. T. Kuhn (ed.) Elsevier Publishing Co., 1971, Chapters 4, 14, 15, 16 the disclosure of which is incorporated herein by reference.

The aqueous scrubbing solution of the present invention preferably comprises ferrous chelates and sulfite ions. A suitable scrubbing solution can be made by the addition of a ferrous salt such as ferrous sulfate, acetate, etc., a water-soluble chelate and a sulfite salt such as potassium, calcium or sodium sulfite, to water. Suitable water-soluble chelates for use in the practice of the present invention are acetylacetone, pyrogallol, ethylenediaminetetraacetate (EDTA), nitrilotriacetate, triethylenetetramine, N, N'-disalicylidene-1,2-propylenediamine, diethylenetriaminepentaacetate, pyrocatechol and hydroxyethylethylene diamine triacetate. Although it is preferred that EDTA be utilized in the practice of the present invention, it will be obvious to the art-skilled that many other water-soluble chelates may also be used.

In solution, the ferrous ion complexes with the chelate. The ferrous-chelate complex concentration is preferably maintained at about 0.05 molar to about 0.4 molar and most preferably at about 0.25 molar to about 0.4 molar. The sulfite ion concentration is maintained at about at least 0.03 molar to about 0.2 molar. The pH of the scrubbing solution is maintained at about 4.8 to about 8.0 and preferably at about 6.0–7.0. At a more alkaline pH, ferric hydroxide begins to precipitate out from the scrubbing solution.

During the scrubbing process, the flue gas containing oxides of nitrogen and sulfur is washed by the scrubbing solution in the enclosure by any suitable manner such as by spraying the scrubbing solution across the flow of the flue gas. The following reactions are believed to occur during the scrubbing process:

I. $SO_2$ Reaction:

$$SO_2 + 2OH^- \rightarrow SO_3^= + H_2O$$

II. NO Absorption Reaction:

$$Fe^{+2} - EDTA + NO \rightarrow NO - Fe^{+2} - EDTA$$

III. Subsequent Reactions:

$$2NO - Fe^{+2} - EDTA + SO_3^\times + H_2O \rightarrow N_2 + SO_4^= + Fe^{+3} - EDTA + 2OH^- \quad 2Fe^{+2} - EDTA + \tfrac{1}{2}O_2 + H_2O \rightarrow 2Fe^{+3} - EDTA + 2OH^-$$

$$NO - Fe^{2+} - EDTA + SO_3^= + H_2O \rightarrow \tfrac{1}{2}N_2 + \tfrac{1}{2}S_2O_6^= + Fe^{3+} - EDTA + 2OH^-$$

Also during the scrubbing process, the nitrogen dioxide in the flue gas reacts with the sulfite ions in solution to form nitrogen. Further, minor amounts of dithionate ion are formed during the process. It is believed that during the scrubbing process the nitric oxide complexes with the ferrous chelate to enhance its reduction to non-polluting nitrogen gas.

The scrubbing process results in the conversion of nitrogen oxides in the flue gas to non-polluting nitrogen gas which is released into the atmosphere. Further, the sulfur dioxide in the flue gas is converted into sulfate ions and a portion of the ferrous chelates in the solution are oxidized to ferric chelates.

The spent scrubbing solution contains unreactive ferric chelates, dithionate ions and an excess of sulfate ions. Due to the large cost of the reagents, it is economically desired to regenerate the scrubbing solution rather than adding new scrubbing solution. The spent scrubging solution is regenerated by passing the solution through the cathode compartment of an electrochemical cell. The regeneration process involves the removal of excess sulfate and dithionate ions from the scrubbing solution and the electrolytic reduction of the non-reactive ferric chelate to the reactive ferrous chelate.

Referring to the drawing, there is illustrated a suitable flow-through electrochemical cell for the practice of the present invention. The cell comprises generally anode compartments 10 having anodes 12 disposed therein and cathode compartments 14 having cathodes 16 disposed therein. The anode and cathode compartments are separated by suitable ion transfer membranes such as anion and cation transfer membranes 18 and 20 respectively.

Suitable ion transfer membranes only permit the passage of certain ions therethrough. The anion transfer membrane preferably permits the passage of sulfate and dithionate ions therethrough and the cation transfer membrane preferably permits the transfer of hydrogen ions therethrough. Suitable anion membranes comprise sulfonated copolymers of vinyl compounds. Both types are preferably homogeneous films, cast in sheet form on a synthetic cloth backing. Suitable cation and anion transfer membrane are manufactured and sold by Ionics Inc. under the trade label of CR 61 183 and 103 PZL 183 respectively. However, it will be obvious to one skilled in the art that other suitable ion transfer membranes can be utilized in the process of the present invention such as those disclosed in Industrial Processing with Membranes, Robert E. Lacey and Sidney Loeb (eds.) John Wiley & Sons, Inc., 1972, Chapter 1, 2, and 3, the disclosure of which is incorporated herein by reference.

To regenerate the scrubbing solution, the solution is passed through the cathode compartment of the electrochemical cell. Acid is circulated through the anode compartment of the electrochemical cell in a closed loop. The water preferably contains dissolved electrolytes to increase conductance and most preferably contains an acid such as sulfuric acid. At the cathode, the ferric chelate is reduced to ferrous chelate by electrons supplied by an external power source. At the anode, the water is correspondingly oxidized to form oxygen and hydrogen ions. The current between the anode and cathode causes a transport of the sulfate and dithionate ions from the scrubbing solution through the anion transfer membrane into the anode compartment. This current also causes the transport of hydrogen ions from the anode compartment through the cation transfer membrane into the cathode compartment. In the cathode compartment, the hydrogen ions combine with excess hydroxyl ions in the scrubbing solution which were formed during the scrubbing process. In the anode compartment, the sulfate and dithionate ions combine with the hydrogen ions to form sulfuric acid and dithionic acid.

The concentration of sulfuric acid in the circulating water stream is preferably maintained at about 0.1 molar to about 4 molar and most preferably at about 0.5 molar at a pH of about 0 to about 1.5. When the concentration of the sulfuric acid in the circulating water stream exceeds this amount, the excess sulfuric acid is removed by the side stream addition of slaked lime to form gypsum precipitate which is readily removed from the solution. The concentration of the various reagents is maintained by the selection of suitable ion transfer membranes and suitable current flows.

The following example is given primarily by way of illustration and not of limitation. An apparatus according to the present invention was tested at the Mohave Generating station. The flue gas which was washed during the test comprised about 320 to 350 ppm $NO_x$ and 350 to 450 ppm $SO_2$. The flue gas flow rate was 2200 scfm. The regeneration system comprised four electrochemical cell modules arranges in parallel. Each cell module comprises 16 cathode plates and 15 anode plates having dimensions of about 42 inches by 18 inches. Two cell modules also comprised 30 anion transfer membranes each and two comprised 30 cation transfer membranes each sold by Ionics, Inc. as 103 PZL 183 and 61 CZL 183, respectively. Each cell module was equipped with independent AC/DC power supply and the electrodes were connected in parallel to the power supply. Each power supply required 480 volts (three phases) and delivered up to 3,000 amperes DC at 5 volts with less than five percent AC ripple during the test which corresponded to 28 amperes per square foot of cathode area. The cell voltage at full load was approximately 3 volts. Each module was internally manifolded to supply scrubber solution to the cathode compartments and aqueous sulfuric acid to the anode compartments.

The following table is a summary of the test conditions and results:

| Test No. | D-1 | D-2 | D-3 | D-4 |
|---|---|---|---|---|
| Test Duration (Hours) | 9.0 | 9.0 | 9.0 | 9.0 |
| Cell Amperes (per cell) | 2780 | 2840 | 2750 | 2373 |
| Reagent Flow rate (gpm/cell) | 15 | 15 | 15 | 15 |
| Acid Flow Rate | | | | |

-continued

| Test No. | | D-1 | D-2 | D-3 | D-4 |
|---|---|---|---|---|---|
| (gpm/cell) | | 11 | 15 | 14 | 13 |
| Reagent Concentrations (gram mole/liter) | | | | | |
| $Fe^{+2}$ | Start | 0.286 | 0.269 | 0.240 | 0.268 |
| | Finish | 0.252 | 0.222 | 0.231 | 0.228 |
| $Fe^{+3}$ | Start | 0.027 | 0.093 | 0.105 | 0.103 |
| | Finish | 0.096 | 0.094 | 0.063 | 0.102 |
| EDTA | Start | 0.205 | 0.295 | 0.410 | 0.370 |
| | Finish | 0.305 | 0.255 | 0.262 | 0.284 |
| $SO_3^=$ | Start | 0.057 | 0.049 | 0.063 | 0.050 |
| | Finish | 0.077 | 0.077 | 0.082 | 0.074 |
| Reagent pH | Start | 5.9 | 7.1 | 7.3 | 7.1 |
| | Finish | 7.1 | 7.8 | 7.7 | 8.0 |
| Circulating $H_2SO_4$ (gram moles/liter) | | | | | |
| | Start | 0.220 | 0.265 | 0.355 | 0.417 |
| | Finish | 0.967 | 0.698 | 0.784 | 0.797 |
| $Fe^{+2}$ Regenerated(%) | | 97 | 95 | 99 | 90 |
| $SO_4^=$ transferred to anode as % of $SO_2$ removed from flue gas (%) | | 67 | 66 | 69 | 83 |

From the above results, it can be seen that the apparatus and method of the present invention removes the sulfate ions from the spent scrubber solution and reduces the unreactive ferric chelate to ferrous chelates to regenerate the scrubber solution and enable its continued use.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of the appended claims.

I claim:

1. A method for regenerating a spent gas scrubbing solution to remove ferric chelates and sulfate ions therefrom comprising the steps of:
    introducing said solution into the cathode compartment of an electrochemical cell, said cell having an anode compartment separated from said cathode compartment by an ion transfer membrane;
    circulating water through said anode compartment;
    passing a current from said cathode compartment to said anode compartment to cause the reduction of the ferric chelates to ferrous chelates and the oxidation of water in the anode compartment to form hydrogen ion, said current causing the transportation of sulfate ions in said cathode compartment through said ion transfer membrane into said anode compartment, said sulfate ions reacting with said hydrogen ions to form sulfuric acid.

2. The method of claim 1 wherein said chelates are selected from the group consisting of acetyl-acetone, pyrogallol, ethylenediaminetetraacetate, nitrilotriacetate, triethylenetetramino, N,N'-disalicylidene-1,2-propylenediamine, diethylenetriaminepentaacetate, pyrocatechol and hydroxyethylethylene diamine triacetate.

3. The method of claim 1 where said chelate is ethylenediaminetetraacetate.

4. The method of claim 1 wherein said ion transfer membrane comprises copolymers of vinyl compounds containing quaternary ammonium groups and tertiary amine groups.

5. The method of claim 1 wherein said sulfuric acid is removed from said circulating acid by the addition of slaked lime to form a gypsum precipitate.

6. A method for removing oxides of nitrogen and sulfur from flue gas comprising the steps of:

contacting said flue gas with a scrubbing solution comprising ferrous chelates and sulfite ions to cause the oxidation of said ferrous chelate to ferric chelate and the conversion of the oxides of sulfur into sulfate ions;

passing the spent scrubbing solution including ferric chelate and sulfate ions into the cathode compartment of an electrochemical cell, said cell having an anode compartment separated from said cathode compartment by an ion transfer membrane;

circulating water through said anode compartment;

passing a current from said cathode compartment to said anode compartment to regenerate said spent solution by causing the reduction of said ferric chelates to ferrous chelates, said current causing the transportation of sulfate ions in said cathode compartment through said ion transfer membrane into said anode compartment to react with the hydrogen ions and form sulfuric acid.

7. The method of claim 6 wherein the concentration of ferrous chelates in said scrubbing solution is maintained at about 0.05 molar to about 0.4 molar.

8. The method of claim 6 wherein the concentration of sulfite ion in said scrubbing solution is maintained at about 0.03 molar to about 0.2 molar.

9. The method of claim 6 wherein the pH of said scrubbing solution is maintained at about 4.8 to about 8.0.

10. The method of claim 1 wherein said water contains dissolved electrolytes.

11. The method of claim 10 wherein said electrolyte is sulfuric acid.

12. The method of claim 6 wherein said water contains dissolved electrolyte.

13. The method of claim 12 wherein said electrolyte is sulfuric acid.

* * * * *